United States Patent [19]
Waintroob

[11] Patent Number: 5,243,463
[45] Date of Patent: * Sep. 7, 1993

[54] VISOR FOR A VIDEO DISPLAY TERMINAL

[76] Inventor: Stewart B. Waintroob, 2900 W. Straford, Chandler, Ariz. 85224

[*] Notice: The portion of the term of this patent subsequent to Jun. 9, 2009 has been disclaimed.

[21] Appl. No.: 895,914

[22] Filed: Jun. 9, 1992

Related U.S. Application Data

[63] Continuation-in-part of Ser. No. 635,290, Dec. 28, 1990, Pat. No. 5,121,253.

[51] Int. Cl.⁵ ............................................. G02B 27/00
[52] U.S. Cl. ..................................... 359/601; 359/609
[58] Field of Search ............... 359/599, 601, 602, 609, 359/614; 358/252, 255

[56] References Cited
U.S. PATENT DOCUMENTS 4,013,465  3/1977  Clapham et al. ................... 359/601
5,095,385  3/1992  Stroll, Jr. ............................ 359/601
5,115,345  5/1992  Hobson et al. ...................... 359/601
5,121,253  6/1992  Waintroob .......................... 359/601

Primary Examiner—Loha Ben
Attorney, Agent, or Firm—Lowell W. Gresham; Jordan M. Meschkow; Don J. Flickinger

[57] ABSTRACT

A display visor for attaching to a display unit of a computer work station and for minimizing the magnitude and amount and intensity of reflected light beams caused by light beams projected by the screen of a computer display unit is disclosed. The display visor includes a left wall having a left inner layer, a right wall having a right inner layer, and a top wall having a top inner layer. Each inner layer is a granular or texturized layer of a substantially black coloring for diffusing a part of the projected light beam in inner surface recesses of each inner layer and for absorbing another part of the projected light beam in the substantially black coloring.

20 Claims, 3 Drawing Sheets

VISOR FOR A VIDEO DISPLAY TERMINAL

RELATED APPLICATIONS

This invention is a continuation-in-part of "Visor For a Computer Terminal Display and Method" by Stewart B. Waintroob, Ser. No. 07/635,290, filed Dec. 28, 1990, now U.S. Pat. No. 5,121,253.

TECHNICAL FIELD OF THE INVENTION

The invention generally relates to a visor a for display type equipment and method, and, in particular, the invention relates to a visor for a computer or other video display and method having means including a light absorbing and non-reflecting inner surface that increases visual contrast on the display including color and depth, reduces glare, avoids wash out of images on the display, and permits a user of the display much greater comfort and ease in the use of the display thereby providing a higher level of concentration and focus on the images located on the display.

BACKGROUND OF THE INVENTION

The prior art display visor for connection to a monitor or display terminal of a computer or other video display terminal generally comprised left, right and top walls wherein the inner surface of each wall was not able to adequately reduce the glare and light intensity that is reflected from the display off the inner surface of each wall of the visor to the eyes of a person viewing the monitor or display.

One major problem associated with the prior art display visor is that such reflected light from the inner surfaces of the walls of the visor are simultaneously viewed by the user along with the information contained on the display thereby causing a difficulty in seeing the specific contents on the monitor screen without visual interference, also known as visual noise, glare, and good contrast.

U.S. Pat. No. 4,340,276 discloses a method for reducing reflectivity on the surface of a lens, window or similar light transparent medium. There is no suggestion, disclosure nor teaching in this reference of a visor for a display nor how the disclosed method could be used to provide a visor with an internal continued black and granular surface to reduce glare.

U.S. Pat. No. 4,114,983 discloses a light transmission type optical element which has an anti-reflecting surface. There is no suggestion, disclosure nor teaching in this reference of a visor for a display nor how the disclosed light transmission type optical element with its anti-reflecting surface could be used to provide a visor with an internal combined black and granular surface to reduce glare.

U.S. Pat. No. 3,378,636 discloses a light filter mounted on a color television tube. The filter body is made of transparent material and incorporates a plurality of filter elements wherein each element constitutes a tier of alternating transparent and light absorbing areas to provide multiple light transmitting apertures bordered by light absorbing material. There is no suggestion, disclosure nor teaching in this reference of a visor for a display nor how the filter with its multiple light transmitting apertures bordered by light absorbing material could be used to provide a visor with an internal combined black and granular surface to reduce glare.

U.S. Pat. No. 2,955,507 discloses a focusing plate or lens type device wherein a rough surface on the plate acts to diminish focusing and a ground glass surface area serves to provide sharp focusing. There is no disclosure of a visor for a display nor how the focusing plate could be used with its light transmissive and opaque regions to provide a visor with an internal combined black and granular surface to reduce glare.

U.S. Pat. No. 2,612,612 discloses a Cathode Ray Tube having a light transmissive glass face plate thereon which has protuberances thereon to reduce the reflectivity of the viewing plate. There is no disclosure of a visor for a display nor how the light transmissive glass face plate can be used to provide a visor with an internal combined black and granular surface to reduce glare.

U.S. Pat. No. 4,772,096 discloses a light shade which uses a plurality of opaque walls located along the thickness of a light transmissive medium thereby defining light transmissive cells. A light transmissive substrate plate has one surface attached to the light shade while the other surface of the light transmissive substrate is microscopically rugged. However, there is no disclosure of a visor having an internal combined black and granular surface to reduce glare nor how the light shade can be used to provide a visor with an internal combined black and granular surface to reduce glare.

U.S. Pat. No. 4,190,321 discloses a coating technique for use on, for example, optical devices such as lenses or windows wherein a metal layer is deposited which layer is then formed into an oxide layer and the surface thereof converted into a plurality of leaflets to provide an anti-reflecting surface. However, there is no disclosure of a visor or the use of a visor having an internal combined black and granular surface to reduce glare nor how the coating technique can be used to form a visor having an internal combined black and granular surface to reduce glare.

U.S. Pat. No. 4,753,516 discloses an anti-reflection plate for a display device which uses two layers on a transparent substrate. One layer is flat and transparent while the second layer applied to the first layer has an uneven surface thereon to prevent reflection of external light on a screen of a display device. However, there is no disclosure of a visor nor of a visor for a computer display that has an internal combined black and granular surface to reduce glare.

None of the above cited references teach or disclose a visor for a computer terminal display that incorporates combining both a generally black or light absorbing and non-reflecting inner surface on the walls of the visor to achieve all of the advantages noted above associated therewith.

SUMMARY OF THE INVENTION

Accordingly, it is an advantage of this invention to provide an improved visor for a computer display and method.

It is another object of this invention to provide an improved visor for a computer terminal display wherein the inner surfaces of the walls of the visor function to increase visual contrast on the display including color and depth, reduce glare, avoid wash out of the images on the display, and permits a user of the display much greater comfort and ease in the use of the display thereby providing a higher level of concentration and focus on the images located on the display.

It is still another advantage of this invention to provide an improved visor for a computer display and method wherein ultra violet light exposure from the display is reduced.

In accordance with the above and other advantages, an improved display visor for connection to a video monitor or display is provided. This display visor comprises a left wall, a right wall and a top wall respectively having a left inner surface, a right inner surface and a top inner surface, each inner surface being a substantially black, granular layer having minute recesses and projections for both absorbing light and preventing light reflection.

By using the light absorbing and non-reflecting inner surfaces, the problems and the difficulties described above in viewing the monitor screen or display are greatly minimized or avoided.

The foregoing and other objects, features and advantages will be apparent from the following description of the preferred embodiment of the invention as illustrated in the accompanying drawings.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings, in which like reference numbers refer to similar items throughout the drawings, and.

DETAILED DESCRIPTION OF THE PREFERRED EMBODIMENTS

Figure 1:
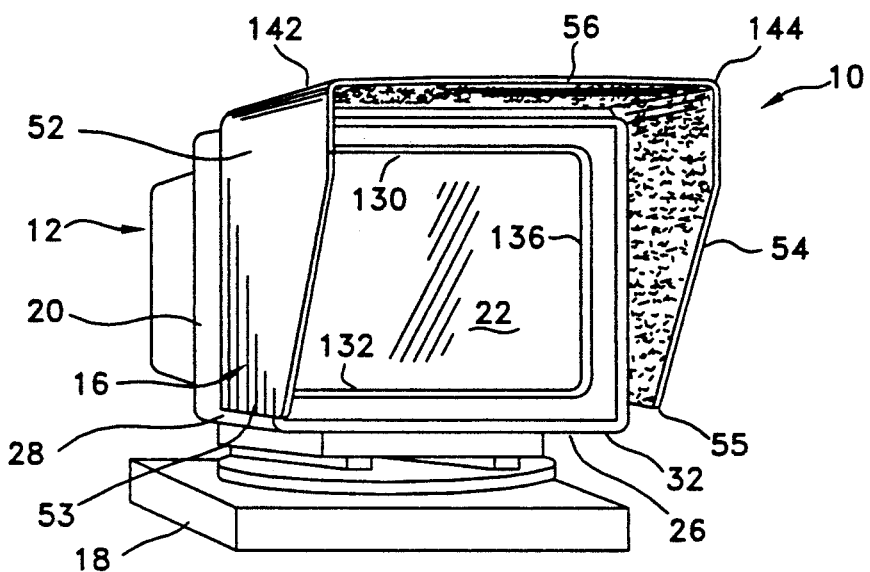
FIG. 1 is a perspective view of a computer assembly according to the invention showing the visor mounted in front of a computer terminal display.

As shown in FIGS. 1 through 6, a computer work station assembly 10 is provided. Assembly 10 includes a computer monitor or display subassembly 12 and a connector subassembly 14 (see FIG. 2) and a hood or visor subassembly 16.

While display assembly, video display terminal, or simply display 12 is a common computer component, those skilled in the art will appreciate that display 12 may present television and other types of programming rather than computer-generated information. Display subassembly 12 preferably includes a base 18 and a computer display component or unit 20, which, preferably, can be angularly displaced relative to base 18. Display unit 20 has a preferably glass window or screen 22 (see FIG. 1), which preferably has a convex outer surface 24 (see FIG. 7). Display unit 20 also has a rectangular frame 26 (see FIG. 2), which is disposed around screen 22. Frame 26 has left and right bezels or side surfaces 28 and 30 (see FIG. 3). Frame 26 also has bottom and top side surfaces 32 (see FIG. 1) and 34 (see FIG. 2). Display subassembly 12 and visor subassembly 16 respectively have matching outer surface colors which are preferably a granular beige type surface.

In accordance with a typical display 12, screen 22 is formed in a generally rectangular shape having greater width than height, although this is not a requirement of the present invention. Screen 22 is typically located in the central region of display unit 20. Screen 22 has top, bottom, left, and right sides 130, 132, 134, and 136, respectively. By way of example, in a common "fourteen inch" version of display 12, the distance between top and bottom sides 130 and 132 is typically around eight inches, and the distance between left and right sides 134 and 136 is around eleven inches. Those skilled in the art will appreciate that during the operation of display 12, phosphors (not shown) in screen 22 emit light, and that light may describe a wide variety of images having a wide variety of colors, depending on the programming being displayed.

In a first embodiment of the present invention, connector subassembly 14 includes left and right minute hook and loop strips 36 and 38 (see FIG. 3), which are sold under the trademark "VELCRO". Hook and loop strips 36 and 38 are used to attach visor 16 to display 12. Left strip 36 has a preferably adhesive-backed hook strip portion (not shown) and a preferably adhesive-backed loop strip portion 42 (see FIG. 2). Right strip 38 also has a preferably adhesive-backed hook strip portion 44 and a preferably adhesive-backed loop strip portion 46. The two hook strip portions including hook strip portion 44 are respectively attached to left side surface 28 (see FIG. 1) and right side surface 30 (see FIG. 2) of visor 12.

While the use of hook and loop strips 36 and 38 is the presently preferred technique for attaching visor 16 to display 12, those skilled in the art will appreciate that visor 16 may be attached to display 12 in other ways. For example, a suitable adhesive may be used to attach visor 16 to display 12, either directly or through the use of double-sided adhesive tape. Alternatively, display 12 and visor 16 may be cooperatively designed so that visor 16 mechanically mates with display 12 in a snapping action or otherwise.

Left and right strips 36 and 38 have respective upper corner substantially L-shaped foam pieces 48 and 50 (see FIGS. 3, 5 and 6) in contact therewith at the upper portion of the strips 36 and 38. In the first embodiment of the present invention, these two corner pieces 48 and 50 protect against unwanted light entering the interior of the visor 16 from the corners of the display subassembly 12 and also serve to compensate for various different corner shapes for the display subassembly 12. In the first embodiment, a continuous lip or bent extension portion 51 (see FIGS. 3 and 5) which is preferably at a 90 degree angle extends from top wall 56 along the back of the visor 16. The end of the bent extension portion 51 is used to be placed in the groove between the top surface 34 and the remainder of the display 20 thereby positioning the top wall 56 slightly above the top of the surface 34 to provide a better and more complete view of the images on the display 20.

Figure 4:
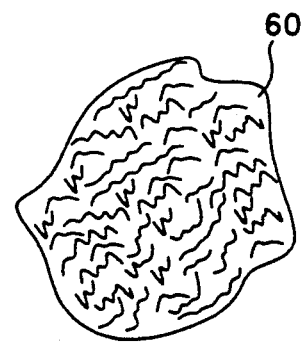
FIG. 4 is an elevational view of a portion of the inner surface of the visor of FIG. 1 as taken along line 4—4 of FIG. 3.
Figure 5:
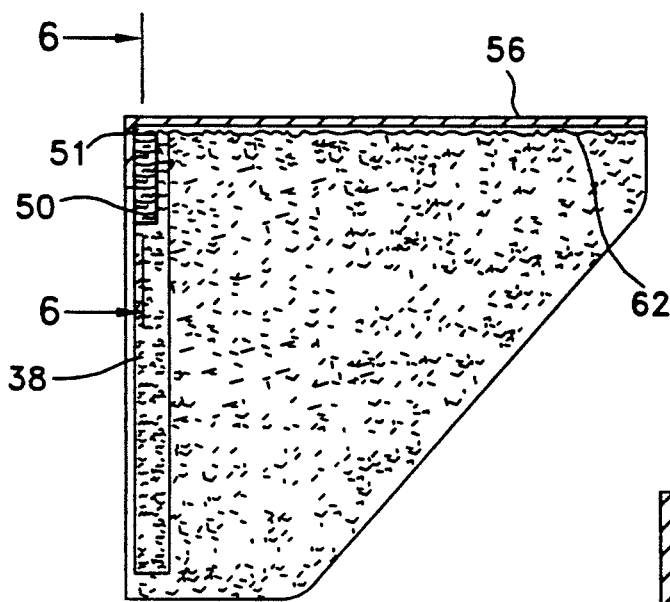
FIG. 5 is a sectional view as taken along line 5—5 of FIG. 3.
Figure 6:
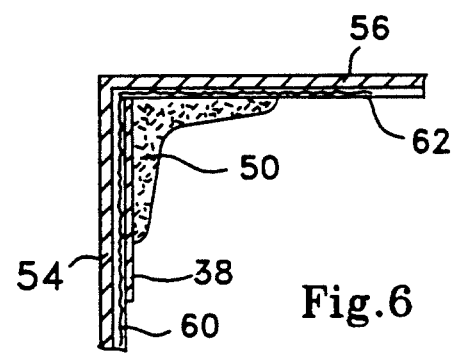
FIG. 6 is a sectional view as taken along line 6—6 of FIG. 5 illustrating one of the two corners of the visor.

Visor subassembly 16 has left and right side sections or walls 52 and 54 (see FIG. 3), and has top section or wall 56. In the first embodiment of the present invention, walls 52, 54, and 56 are preferably made of a semi-flexible plastic material for ease of fitting walls 52, 54, and 56 to left, right and top side surfaces 28, 30, and 34 of the display 12. Left, right and top walls 52, 54, and 56 of the visor 16 respectively have left, right and top light absorbing inner surfaces or layers 58, 60, and 62, respectively, which also serve the additional function of preventing the reflection of light. Layers 58, 60, and 62 are shown exaggerated in thickness in the drawings for ease of illustration. Layers 58, 60, and 62 are composed of a black granular material wherein the black serves to absorb light while the granular surface serves to prevent the reflection of light toward the viewer from the two sides and top of visor 16. FIG. 4 depicts one example of the granular surface of the portion of layer 60.

Since inner layers 58, 60, and 62 are configured to absorb light, the black coloring of layers 58, 60, and 62 plays a role. Preferably, the coloring of layers 58, 60, and 62 is as close to absolute black as possible. However, those skilled in the art will appreciate that other colors that are substantially or otherwise similar to black, such as dark browns, dark blues, and the like, will produce acceptable results as well.

As discussed above, inner layers 58, 60, and 62 are configured to prevent the reflection of light. However, as a practical matter, preventing the reflection of all light impinging upon inner layers 58, 60, and 62 is difficult to accomplish in practice. Accordingly, those skilled in the art will appreciate that by preventing the reflection of light it is primarily intended to substantially prevent the reflection of light toward the eyes of a user (not shown) of display 12 and is particularly intended to prevent the specular or mirror-like reflection of light.

In other words, a first portion of light incident at layers 58, 60, and 62 is absorbed and a second portion of light incident at layers 58, 60, and 62 is reflected. Preferably, the second reflected portion is dispersed in all directions so that images cannot be discerned at layers 58, 60, and 62. Moreover, a large portion of this reflected light will again impinge upon an inner layer 58, 60, or 62. The process repeats with a portion of the reflected portion now being absorbed. Preferably, only a small portion of light originally incident upon a layer 58, 60, or 62 reaches a user, and this small portion has been thoroughly diffused. Hence, for the most part, light reaching the user's eyes comes directly from screen 22 and is not diluted with images reflected from inner layers 58, 60, and 62 of visor 16.

Figure 7:
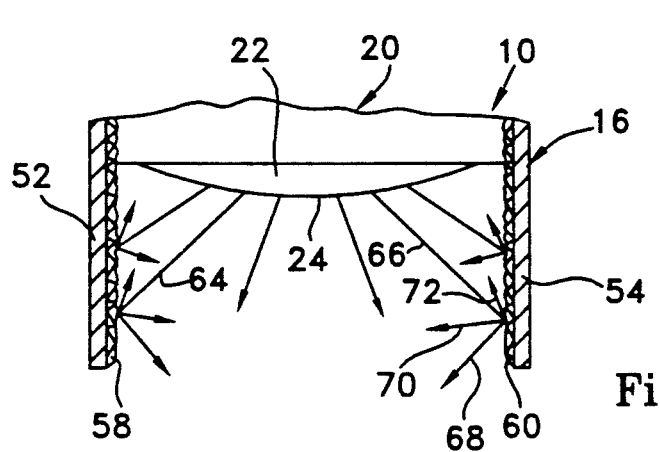
FIG. 7 is a sectional view as taken along line 7—7 of FIG. 3 depicting the operation of the inner surface of the visor on light striking the visor's inner surface.
Figure 8:
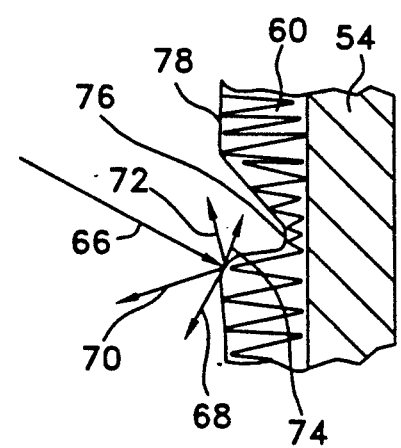
FIG. 8 is an enlarged view of a small portion of the inner surface of the visor depicting in more detail the operation of the inner surface of the visor on light striking the visor's inner surface as shown in FIG. 7.

As shown in FIG. 7, screen 22 projects a plurality of left and right light beams 64 and 66 as well as light beams in all directions including up and down. Similar top (or upwardly directed) light beams (not shown) are also projected by screen 22. Typical beam 66, which is like beam 64, has reflected light beam portions 68, 70, and 72. As shown in FIG. 8, a reflected light beam portion 74 is dissipated and absorbed by the black granular material of layer 60. Black granular side layer 60 (like layers 58 and 62) has minute recesses like recess 76 and projections like projection 78 (see FIG. 8). Light beam portion 74 is reflected back and forth within recess 76 and thus, this reflected light beam portion 74 is prevented from being reflected toward the viewer and is finally absorbed within the recess 76. Thus, the combination of the black (light absorbing material) and the granular (to prevent light reflection) surface cooperate together to provide to a viewer a dramatic increase in contrast for both color and depth, an elimination of a wash out of the images being viewed, relief from undesired glare and light reflection off the walls of the visor 16, greater clarity, focus and concentration, elimination of visual noise or interference and absorption of undesired UV (ultra violet) light radiation. A part or portion of the projected light beam 66 is directly absorbed by the light absorbing black material of layer 60.

Figure 9:
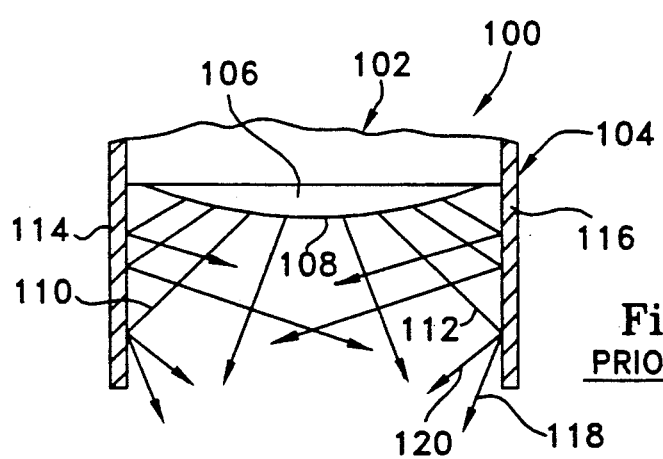
FIG. 9 is a sectional view of a prior art computer work station assembly and attached visor corresponding to FIG. 7, but depicting the reflection of light striking the inner surface of the prior art visor.

As shown in FIG. 9, a prior art assembly 100 is illustrated for comparison with assembly 10. Assembly 100 has a display unit 102 and a visor subassembly 104. Display unit 102 has a screen 106 which has an outer convex surface 108. Screen 106 projects a plurality of left and right light beams 110 and 112, which are not substantially absorbed or diffused by its left and right walls 114 and 116. Typical beam 112, like beam 110, has reflected light beam portions 118 and 120, which are substantially larger in intensity and amount than the light beam portions 68, 70, 72, and 74 (see FIG. 8) of corresponding light beam 66 of assembly 10 according to the invention.

With reference back to FIGS. 3, 4 and 8, it is the granular, texturized, or rough nature of layers 58, 60, and 62 which serves to diffuse light reflected therefrom. Of course, those skilled in the art will appreciate that specific discrete grains of a substance are not required to be attached at layers 58, 60, and 62. Rather, layers 58, 60, and 62 are simply textured to have a rough finish. In particular, recesses 76 and projections 78 cause layers 58, 60, and 62 to have surface irregularities that are relatively large compared to the wavelength of visible light. Thus, reflections therefrom are diffuse rather than specular. Preferably, these irregularities are continuously dispersed over the entirety of layers 58, 60, and 62 in a random pattern so that no substantial portion of layer 58, 60, or 62 provides a specular reflecting surface.

With reference back to FIG. 1, the geometry of visor 16 is preferably configured in cooperation with the dimensions of display 12. Top wall 56 projects outward from the front of display 12 for a distance which is related to the height of screen 22. In general, top wall 56 projects for a distance of around the height of screen 22 or greater. This distance substantially blocks overhead light from reflecting off screen 22, which is a generally smooth surface, back to the eyes of a user (not shown). As a result, such ambient lighting reflections do not substantially mix with light being emitted from screen 22. Color contrast is improved, the perception of depth is enhanced, and color washout is reduced.

In general, in an office environment less interfering ambient light impinges upon screen 22 from side directions than from overhead. Consequently, left and right side walls 52 and 54 may taper from the outward extension at top wall 56 back toward display 12. This is advantageous because it lessens an undesirable tunneling effect that otherwise might be perceived by a user. However, this tapering of side walls 52 and 54 need not begin precisely at top wall 56 and need not extend precisely to frame 26 at lower sides 53 and 55 of side walls 52 and 54, respectively, as shown in FIG. 1. Moreover, lower sides 53 and 55 preferably reside around or beneath bottom side 132 of screen 22. Since side walls 52 and 54 extend to the bottom of screen 22, no significant amount of ambient light reflects off screen 22 in such a way that it interferes with the user of display 22.

Figure 10:
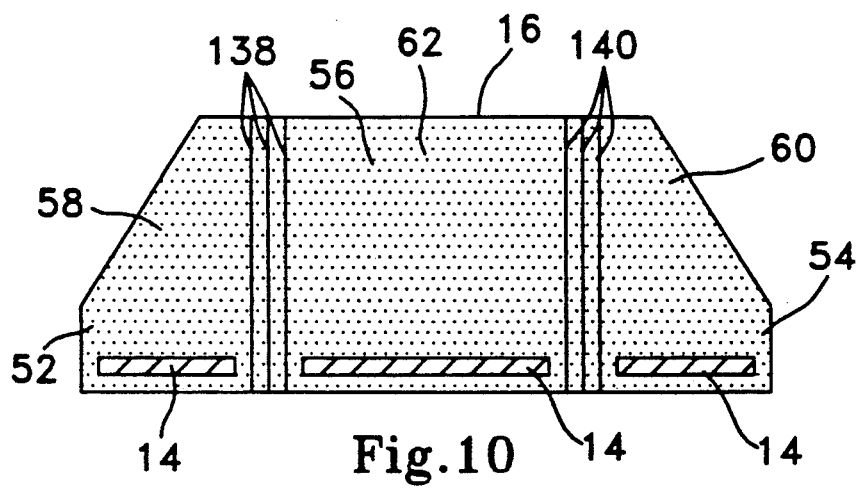
FIG. 10 is an inner surface view of a second embodiment of the present invention in a flattened configuration.

FIG. 10 shows an example of a second embodiment of visor 16. In particular, FIG. 10 illustrates the second embodiment of visor 16 in a flattened configuration, which is desirable for shipping and stocking. In other words, left, right, and top walls 52, 54, and 56, respectively, are substantially coplanar in this flattened configuration. This second embodiment is preferably formed as an integral unit from cardboard, whether corrugated or otherwise. Inner surfaces or layers or surfaces 58, 60, and 62 are painted, dyed, printed, or otherwise formed to exhibit the above-discussed substantially black color, which absorbs light. In addition, layers 58, 60, and 62 are left in an uncovered or otherwise roughened state to exhibit the above-discussed texture which prevents spectral reflections. This texture results from the irregularities of cardboard fibers at inner layers 58, 60, and 62.

This second embodiment of visor 16 includes one or more left score lines 138 proximate the junction between left wall 52 and top wall 56 and one or more right score lines 140 proximate the junction between right wall 54 and top wall 56. Score lines 138 and 140 extend from the front to the back of visor 16, generally in the direction from a user (not shown) of display 12 toward display 12 itself. Score lines 138 and 140 are formed in the cardboard of visor 16 to serve as guides for folding visor 16 into a shape which accommodates display 12, such as that illustrated in FIG. 1.

Figure 2:
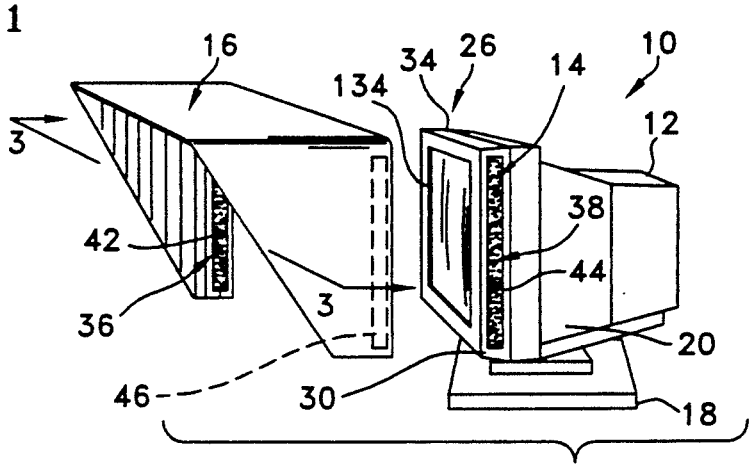
FIG. 2 is an exploded view of the computer assembly of FIG. 1 showing the visor and the means of attachment of the visor to the computer terminal display.
Figure 3:
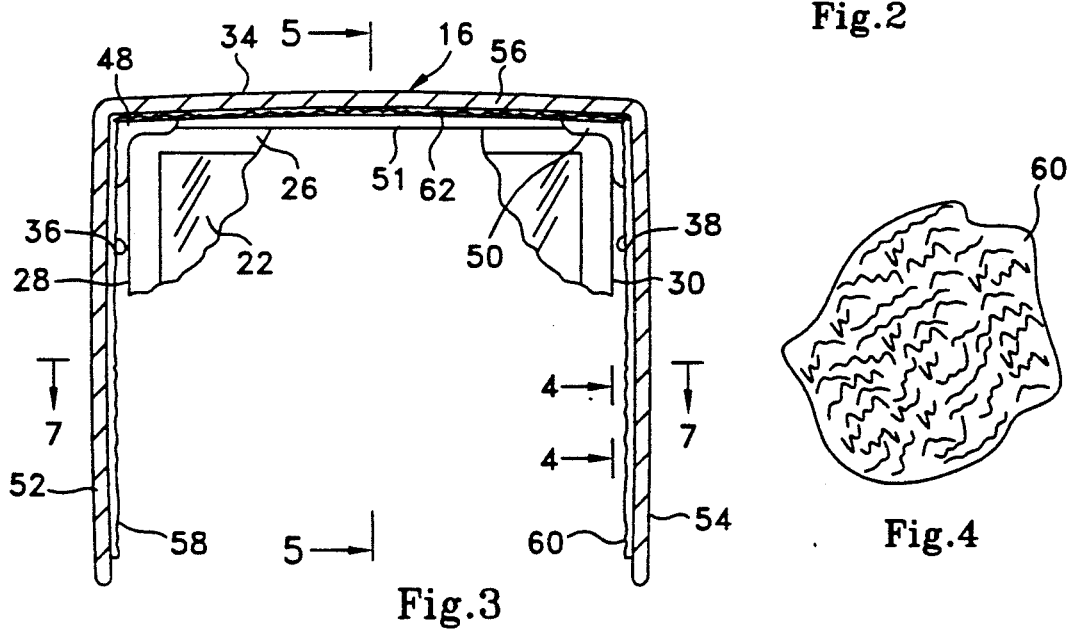
FIG. 3 is a sectional view as taken along line 3—3 of FIG. 2.

In folding visor 16, a set of score lines (one from left score lines 138 and one from right score lines 140) is selected to best match the size of top side surface 34 of frame 26 in display 12 (see FIG. 2). Visor 16 is then folded along the selected score lines 138 and 140 so that inner surfaces 58, 60, and 62 are on the inside of the resulting structure. Visor 16 may then be attached to display 12 as discussed above using connecting assembly 14. The left score line 138 and right score line 140 used for folding visor 16 serve as left and right corners 142 and 144, respectively, (see FIG. 1) of visor 16. The unselected ones of score lines 138 and 140 may be ignored.

Accordingly, the second embodiment of visor 16 is inexpensive to manufacture and sell since it is made from cardboard. Likewise, it is inexpensive and easy to ship, store, handle, and hold on store shelves because it may be kept in its flattened configuration until it is installed on display 12. Moreover, the use of multiple score lines 138 and 140 allows the second embodiment of visor 16 to be adaptable to a wide range in size of displays 12.

Of course, those skilled in the art will understand that score lines 138 and 140 are not absolutely necessary in connection with embodiments of visor 16 which may have a flattened configuration. For example, a cardboard version of visor 16 could be folded without the guidance of score lines even though one would expect that the resulting folds might be less effective or less aesthetically pleasing.

Figure 11:
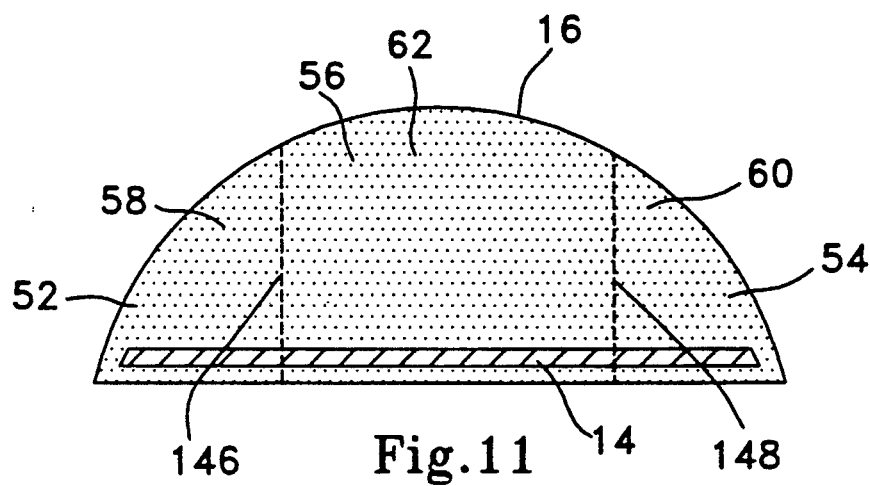
FIG. 11 is an inner surface view of a third embodiment of the present invention in a flattened configuration.
Figure 12:
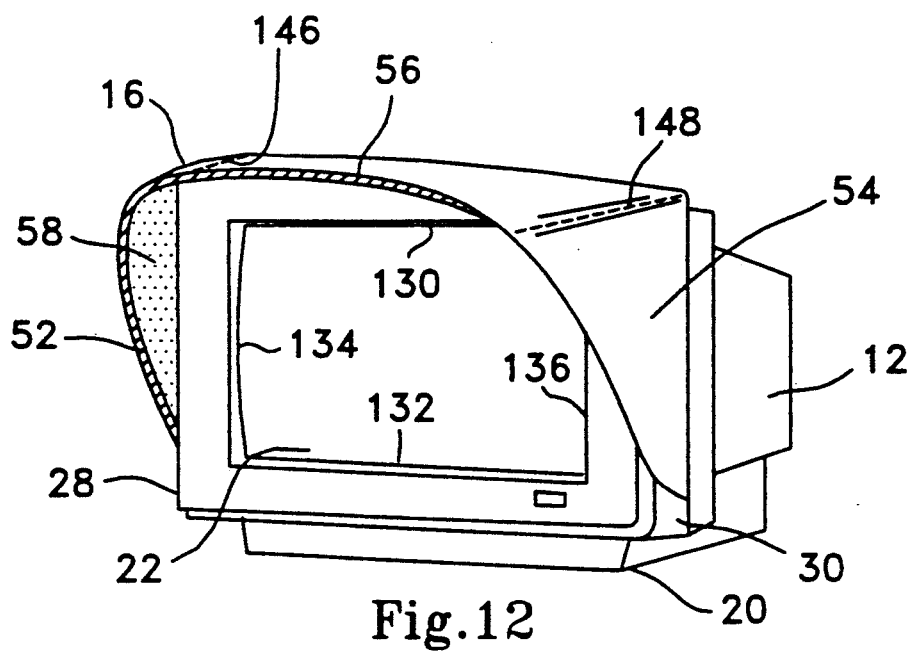
FIG. 12 is a perspective view of the third embodiment of the present invention attached to a video display terminal.

FIGS. 11–12 show a third embodiment of visor 16. This third embodiment is illustrated in a flattened configuration in FIG. 11 and illustrated installed on display 12 in FIG. 12. The third embodiment is constructed from a semi-flexible and preferably resilient material, such as a foam, rubber, or plastic. As discussed above, inner layers or surfaces 58, 60, and 62 exhibit a color, such as black, which substantially absorbs light. Moreover, layers 58, 60, and 62 are texturized to substantially prevent the specular reflection of light as discussed above. Connector assembly 14 is applied to inner layers 58, 60, and 62 as discussed above.

With reference to FIG. 12, the third embodiment of visor 16 is installed on a display 12 by centering it over top side 34 of frame 26 of display 12 (see FIG. 2) and attaching it in this position. Next, the left and right ends of visor 16 are wrapped over and attached to the left and right side surfaces 28 and 30 of frame 26. No score lines are needed, and visor 16 exhibits a somewhat rounded shape. Left wall 52, top wall 56, and right wall 54 are separated from one another at imaginary corners 146 and 148, shown in phantom in FIGS. 11 and 12. Those skilled in the art will appreciate that corners 146 and 148 need not indicate pronounced discontinuities in the shape of visor 16.

Advantages of visor subassembly 16 are briefly indicated hereafter.

A) A dramatically increased contrast, both in color and depth are provided by visor subassembly 16.
B) Glare is substantially eliminated by visor subassembly 16.
C) Visual noise is substantially minimized.
D) Focus and concentration by a user is facilitated.
E) Layers 58, 60, 62 of visor 16 reduce total ultra violet (UV) light exposure.
F) Connector subassembly 14 permits easy adjustment, attachment or removal of the visor subassembly 16 from the work station assembly 10.
G) Walls 52, 54 and 56 of visor subassembly 16, which are made of a semi-flexible material, such as plastic, cardboard, foam, rubber, and the like, facilitate the assembly or adaptation of visor subassembly 16 onto the display unit 20.

While the invention has been described in its preferred embodiment, it is to be understood that the words which have been used are words of description rather than limitation and that changes may be made within the purview of the appended claims without departing from the true scope and spirit of the invention in its broader aspects. For example, layers 58, 60, 62 may, but need not, be a deposited layer or coating or a painted layer, which has a granular or grain-like texture of black, or the like, coloring.

The embodiments of an invention in which an exclusive property or right is claimed are defined as follows:

What is claimed is:

1. A display visor for connection to a display unit of a computer work station comprising:
   a left wall, a right wall and a top wall;
   said left wall having a left inner layer;
   said right wall having a right inner layer;
   said top wall having a top inner layer;
   each said left inner layer, right inner layer and top inner layer having a color similar to a black color and having a plurality of minute recesses and projections.

2. A visor as claimed in claim 1 wherein said recesses and projections are configured to substantially prevent specular reflections.

3. A visor as claimed in claim 2 wherein said recesses and projections are relatively large as compared to the wavelength of visible light.

4. A display visor for connection to a video display terminal to enhance color contrast and to reduce glare, said visor comprising:
   a left wall, a right wall, and a top wall;
   said left wall having a left inner layer;
   said right wall having a right inner layer;
   said top wall having a top inner layer, and said top wall coupling to said left wall and said right wall;
   each of said left inner layer and right inner layer being configured in a color which substantially absorbs light; and
   each of said left inner layer and said right inner layer being configured to exhibit a texture which substantially prevents specular reflections.

5. A visor as claimed in claim 4 wherein said top inner layer is configured in a color which substantially absorbs light and is configured to exhibit a texture which substantially prevents specular reflections.

6. A visor as claimed in claim 4 wherein each of said left and right inner layers are configured in a color similar to black.

7. A visor as claimed in claim 4 wherein said left inner layer and right inner layer are configured to exhibit a texture having recesses and projections relatively large as compared to the wavelength of visible light.

8. A visor as claimed in claim 4 wherein:
   said top wall and said left wall have a common side;
   said top wall and said right wall have a common side; and
   said top, left, and right walls are formed together into an integral unit.

9. A visor as claimed in claim 8 wherein said integral unit is formed from plastic.

10. A visor as claimed in claim 8 wherein said integral unit is formed from cardboard.

11. A visor as claimed in claim 10 wherein said integral unit has a left score line and a right score line, said left and right score lines residing at said left wall and right wall common sides, respectively, to aid in forming corners at said score lines.

12. A visor as claimed in claim 11 wherein said integral unit includes first and second optional score lines positioned proximate said left and right score lines, respectively, said first, left, second, and right score lines together allowing said visor to accommodate different size video display terminals.

13. A visor as claimed in claim 8 wherein said integral unit is formed from a foam material.

14. A visor as claimed in claim 8 wherein:
   each of said left, and right walls has a lower side which opposes said left and right wall common sides, respectively;
   said left and right wall common sides are each configured to project outward from said terminal a greater distance than said respective left and right wall lower sides.

15. A visor as claimed in claim 14 wherein:
   said video display terminal has a display screen centrally positioned therein, said display screen having top and bottom sides; and
   each of said left and right walls is configured so that when said visor is connected to said video display terminal, said left and right wall lower sides extend generally below said bottom side of said display screen.

16. A visor as claimed in claim 14 wherein:
   said video display terminal has a display screen centrally positioned therein, said display screen having top and bottom sides; and
   said top wall projects outward from said terminal a distance which is greater than the distance between said top and bottom sides.

17. A display visor for attachment to a video display terminal having a display screen with top, left, and right sides, said visor serving to enhance color contrast and to reduce glare, and said visor comprising:
   a semi-flexible member having an outer surface and an inner surface, said inner surface being configured in a color which substantially absorbs light, and said inner surface being configured to exhibit a texture which substantially prevents specular reflections;
   said member having a central section for attachment to said terminal proximate said top screen side, said member having a left section for attachment to said terminal proximate said left screen side, and said member having a right section for attachment to said terminal proximate said right screen side, said member projecting outward from said screen with said inner surface thereof facing said screen as compared to said outer surface thereof; and
   said left and right sections of said member being tapered so that portions of said left and right sections located proximate said central section project outward from said screen a further distance than said portions of said left and right sections located distal to said central section.

18. A visor as claimed in claim 17 additionally comprising attachment means coupled to said inner surface of said left and right sections of said member.

19. A visor as claimed in claim 17 wherein said inner surface of said member is configured in a color similar to black.

20. A visor as claimed in claim 17 wherein said inner surface is configured to exhibit a texture having recesses and projections relatively large as compared to the wavelength of visible light.

* * * * *